United States Patent [19]

Yamamoto et al.

[11] Patent Number: 5,309,054
[45] Date of Patent: May 3, 1994

[54] LEADING-OUT DEVICE FOR A LEAD WIRE OF A DC MOTOR AND A METHOD OF LEADING OUT A LEAD WIRE

[75] Inventors: Kyohei Yamamoto; Shuzou Isozumi, both of Hyogo, Japan

[73] Assignee: Mitsubishi Denki Kabushiki Kaisha, Tokyo, Japan

[21] Appl. No.: 9,676

[22] Filed: Jan. 27, 1993

[30] Foreign Application Priority Data

Jan. 31, 1992 [JP] Japan .................................. 4-045898
May 12, 1992 [JP] Japan .................................. 4-146321

[51] Int. Cl.⁵ ............................................ H02K 11/00
[52] U.S. Cl. ...................................... 310/71; 174/73.1
[58] Field of Search ................. 310/43, 51, 71, 85, 310/89, 91, 127; 174/73.1, 74 R, 251, 268

[56] References Cited

U.S. PATENT DOCUMENTS

| 4,315,175 | 2/1982 | Hamilton et al. | 310/71 |
| 4,626,724 | 12/1986 | Morishita et al. | 310/71 |
| 4,754,184 | 6/1988 | Morikane et al. | 310/89 |
| 4,985,654 | 1/1991 | Morikane | 310/249 |

Primary Examiner—Steven L. Stephan
Assistant Examiner—Matthew Nguyen
Attorney, Agent, or Firm—Sughrue, Mion, Zinn, Macpeak and Seas

[57] ABSTRACT

The end of a lead wire of a DC motor composed of twisted wires is formed into a flat shape by welding the twisted wires together, and is inserted or installed through a grommet with the smaller or shorter dimension of the flat shape oriented in the axial direction of the motor.

19 Claims, 3 Drawing Sheets

LEADING-OUT DEVICE FOR A LEAD WIRE OF A DC MOTOR AND A METHOD OF LEADING OUT A LEAD WIRE

BACKGROUND OF THE INVENTION

This invention relates to a leading-out device for a lead wire of a DC motor wherein a lead wire portion connected to a main circuit conductor of the motor and led outside thereof, is improved.

FIG. 3 is a side view of a starter motor wherein a lead wire is led from a direct current motor portion to the outside thereof. A reference numeral 1 designates a starter motor composed as follows. A numeral 2 designates a DC motor, wherein a rear bracket 4 is connected to a rear end of a yoke 3 and a front bracket 6 is connected to a front end thereof through an intermediate bracket 5. Inside thereof, a speed reducing gear device is connected to an armature and a pinion 15 is extended therefrom through an overrunning clutch. A numeral 16 designates an electromagnetic switch wherein a lead wire 12 extended from the motor 2 to the outside thereof, is connected to a main circuit terminal (M terminal) 17. A numeral 13 designates a grommet fitted to a cut-off portion of the yoke 3 through which the lead wire 12 passes and 14, an insulation tube fitted to the lead wire 12.

A circuit diagram of the DC motor 2 is shown by FIG. 4. A numeral 7 designates an armature, 8, brushes and 9, field coils connected to a conductor 10 to which the lead wire 12 is connected at a connecting portion 11.

When current flows in an electromagnetic switch 16, the contact of the circuit is closed, and a current from a storage battery flows from the main circuit terminal 17 to the lead wire 12 and to the main circuit of the DC motor 2 thereby rotating the armature 7. In the meantime, a plunger of the electromagnetic switch 16 is operated, a shift lever (not shown) is swiveled and a pinion 15 is moved forward through an overrunning clutch to mesh with a ring gear of an internal combustion engine. The rotation of the armature 7 is reduced by the speed reducing gear device and rotates the pinion 15 through the overrunning clutch. In this way, the ring gear is rotated and the engine is started.

FIG. 5A is a sectional diagram of a conventional leading-out device for a lead wire. An end of the lead wire 12 composed of twisted wires is connected to the connecting portion 11 of the connecting conductor 10 of the motor 2 by a brazing material. As shown in FIG. 5B by a sectional diagram, a lead wire 12 passing through the grommet 13 made of a gummy material is a twisted-wire conductor composed of a great number of copper wires. Especially, in the starter motor, since a large current flows in the lead wire 12 and in view of the vibration resistance, the diameter thereof is magnified.

In the conventional leading-out device for a lead wire, the outer configuration of the lead wire 12 is circular and thick. The lead wire 12 reaches inside of the yoke 3 through the grommet 13. To maintain a clearance between the lead wire 12 and the inner field coil 9, the motor 2 is elongated in the axial direction, which hampers the downsizing thereof.

Furthermore, in the above conventional leading-out device for a lead wire, in passing the leading-out portion of the lead wire 12 through the grommet 13, a hole of the grommet 13 has an interference to provide a waterproof performance. Therefore the operation is difficult.

Furthermore, a variation of the protruding length of the leading-out portion which passes through the grommet 13 should be avoided and the protruding length should conform to a predetermined length. Therefore, the operation becomes more difficult.

SUMMARY OF THE INVENTION

It is an object of the present invention to solve the above problems and to provide a leading-out device for a lead wire of a DC motor wherein the thickness of the leading-out portion of the lead wire in the axial direction is reduced and the outer configuration of the motor in the axial direction is shortened and downsized. Furthermore, it is an object of the present invention to provide a method of leading out a lead wire wherein the lead wire is provided with the waterproof performance at the grommet portion and the operational performance in connecting the lead wire to an internally connected conductor, is promoted.

It is an object of the present invention to provide a leading-out device for a lead wire of a DC motor wherein it is not necessary to pass the lead wire 12 through the grommet, the waterproof performance and the vibration resistance performance are promoted and the protruding length of the leading-out portion thereof from the grommet is conformed to a predetermined length.

According to a first aspect of the present invention, there is provided a leading-out device for a lead wire of a DC motor comprising:

a lead wire composed of twisted wires, a leading-out portion at an end side of which is formed in a flat shape and is shortened with respect to the axial direction of a DC motor; and a grommet through which said lead wire passes from outside the DC motor to inside thereof;

said leading-out portion of the lead wire is welded and connected to an inner conductor of the DC motor at an end portion thereof.

According to a second aspect of the present invention, there is provided a method of leading out a lead wire of a DC motor comprising the steps of: forming a leading-out portion of a lead wire at an end side thereof composed of twisted wires in a flat shape by a resistance welding or an ultrasonic welding along with a brazing material;

passing said leading-out portion of the lead wire through a grommet from outside the DC motor to inside thereof while aligning a shortening direction of the flat shape with the axial direction of the DC motor; and welding and connecting an end portion of the leading-out portion to an inner conductor by a resistance welding.

According to a third aspect of the present invention, there is provided a leading-out device for a lead wire of a DC motor comprising:

a lead wire composed of twisted wired, a section of a leading-out portion at an end side of which is formed in a rectangular shape shortened with respect to the axial direction of a DC motor; and a grommet integrally formed with and surrounding said lead wire and fitted to a leading-out opening of the DC motor for the lead wire.

According to a fourth aspect of the present invention, there is provided a leading-out device for a lead wire of a DC motor comprising:

a lead wire composed of twisted wires, a section of a leading-out portion at a first end side of which is formed in a rectangular shape shortened with respect to the axial direction of a DC motor, an upper portion of said leading-out portion being bent in an arcuate shape, a section of said bent portion at a second end side thereof being formed and reduced in a rectangular shape; and a grommet integrally formed with and surrounding the leading-out portion and the bent portion and fitted to a leading-out opening of the DC motor for the lead wire.

According to a fifth aspect of the present invention, there is provided the leading-out device for a lead wire of a DC motor according to the third aspect or the fourth aspect, wherein the grommet is laminated with a forming material the same with or different from a material for a portion surrounding the leading-out portion of the lead wire.

In this invention, the leading-out portion at an end side of the lead wire from inside of the machine, is flattened and shortened with respect to the axial direction of the motor, thereby shortening the outer configuration of the motor in the axial direction. Furthermore, in flattening the leading-out portion, the portion is pressed and formed by resistance welding or by ultrasonic welding along with a brazing material. Therefore, in a later step, the end portion of the leading-out portion is connected to an inner conductor by resistance welding and no addition of a brazing material is required. In this way, the flattened leading-out portion prevents invasion of the outside moisture.

In this invention, the grommet is integrally formed with the deformed and reduced leading-out portion on the one end side of the lead wire. The operation of passing the leading-out portion through the grommet is saved. The protruding length of the leading-out portion of the lead wire from the grommet is set to a predetermined length. Furthermore, the invasion of the outside moisture is firmly prevented.

DETAILED DESCRIPTION OF THE PREFERRED EMBODIMENTS

Example 1

Figure 1A:
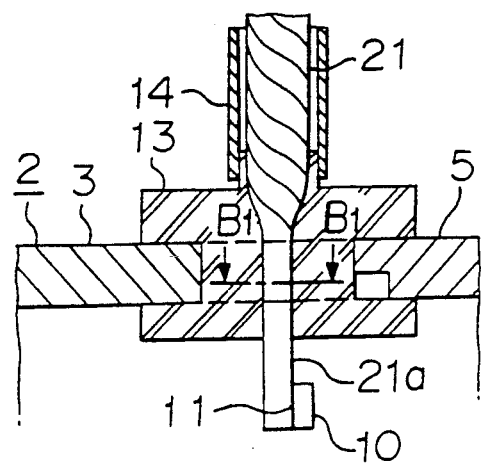
FIG. 1A is a sectional diagram showing a first embodiment of a leading-out device for a lead wire of a DC motor according to the present invention.
Figure 1B:
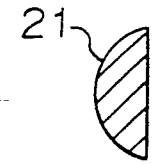
FIG. 1B is a sectional view taken along a line $B_1$—$B_1$ of FIG. 1A.

FIG. 1A is a sectional diagram of a first embodiment of a leading-out device for a lead wire of a DC motor according to the present invention. As shown in FIG. 1B, a leading-out portion of a lead wire 21 composed of twisted wires at an end side thereof passing through the grommet 13, is formed in a semicircular flattened form, shortened with respect to the axial direction of the motor 2 and widened in the peripheral or radial direction thereof. Accordingly, a grommet 13 which is shortened with respect to the axial direction of the motor 2 is employed.

The flattening-deformation of the leading-out portion 21a of the lead wire 21 and the connection of the lead wire 21 to the inner conductor 10, are performed as follows. The leading-out portion of the lead wire 21 is pressed and deformed as shown in FIG. 1B by resistance welding along with a brazing material. The end portion of the leading-out portion 21a is connected to the connecting portion 11 of the inner conductor 10 by resistance welding. At this occasion, the leading-out portion 21a already contains the brazing material and therefore, the addition of the brazing material is not necessary. The lead wire 21 is compressed in a flattened shape containing the brazing material at the grommet 13 and therefore, is excellent in the waterproof performance.

Example 2

Figure 2A:
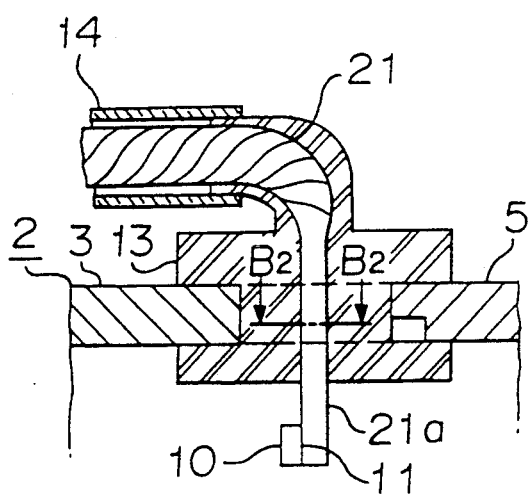
FIG. 2A is a sectional diagram showing a second embodiment of a leading-out device for a lead wire of a DC motor according to the present invention and FIG. 2B, a sectional diagram taken along a line $B_2$—$B_2$ of FIG. 2A.
Figure 2B:
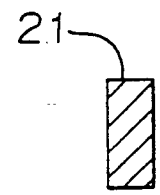
Figure 3:
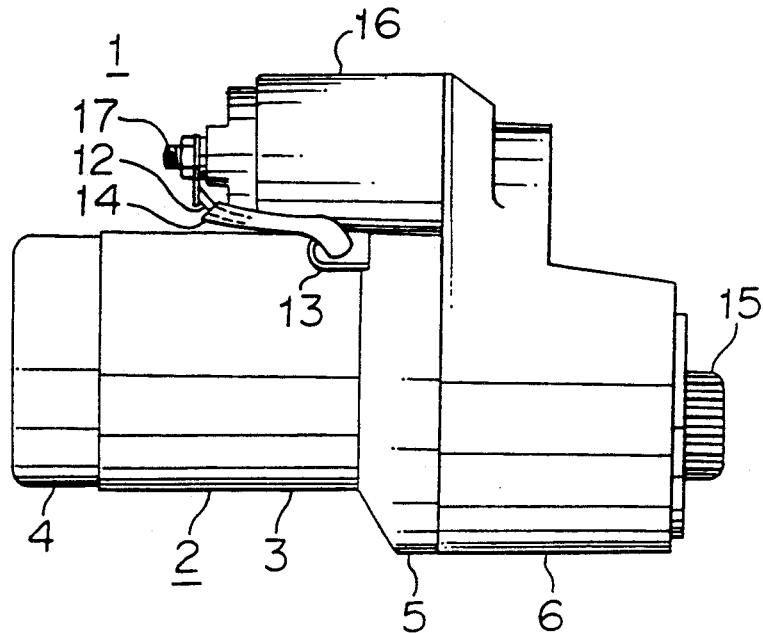
FIG. 3 is a side view of a starter motor provided with a leading-out device for a lead wire.
Figure 4:
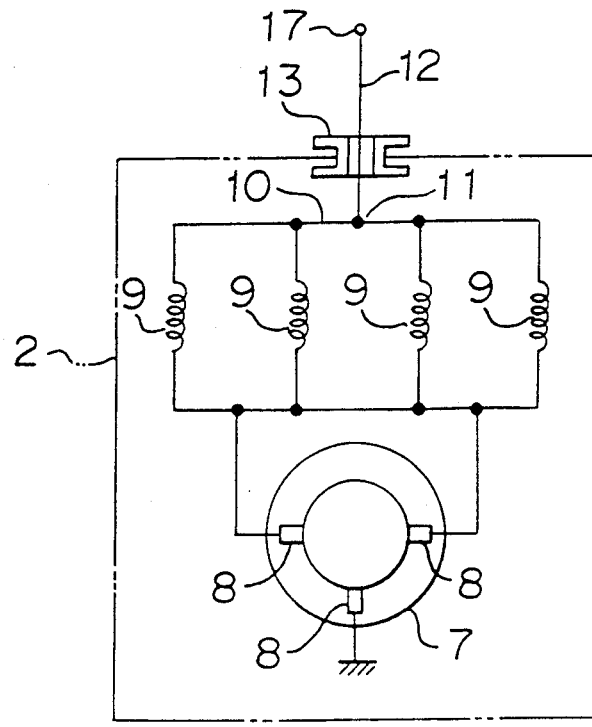
FIG. 4 is a circuit diagram of the motor in FIG. 3.
Figure 5A:
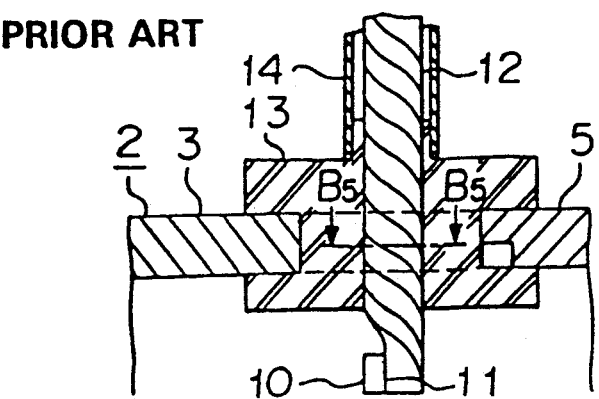
FIG. 5A is a sectional diagram of a leading-out device for a lead wire of a conventional DC motor, and FIG. 5B, a sectional diagram taken along a line $B_5$—$B_5$ of FIG. 5A.
Figure 5B:
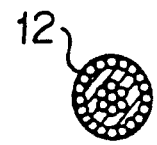

FIG. 2A is a sectional diagram of a second embodiment of a leading-out device for a lead wire according to the present invention. The leading-out portion 21a of the lead wire 11 composed of twisted wires at an end portion thereof, is compressed and deformed in a flat shape with respect to the axial direction of the motor 2 by the same means as in FIG. 1. The section of the leading-out portion 21a is shown in FIG. 2B, which is deformed in a rectangular flattened shape. The lead wire 21 deformed as above is bent in the axial direction with respect to a portion thereof above the grommet 13. The bent portion is fitted with an insulation tube 14, an end of which is fitted to an upper end portion of the grommet 13. In case of FIG. 2A, the device is more excellent in the waterproof performance and the vibration resistance performance.

Example 3

In the above Examples, the flattening-deformation of the lead wire 21 is performed by resistance welding, but it may be performed by the following way. The leading-out portion 21a of the lead wire 21 composed of twisted wires is pressed and deformed in a flattened shape by ultrasonic welding along with a brazing material. Thereafter, the leading-out portion 21a is connected to the inner conductor 10 by resistance welding. According to this method of connecting the leading-out portion, the productivity is further promoted compared with the connection method in Example 1.

Furthermore, in the above Examples, cases are shown wherein the flattened shape of the leading-out portion 21a of the lead wire 21 is semicircular or rectangular. However, the shape is not limited to the above Examples and may be oval or trapezoidal.

As stated above, according to the present invention, since the leading-out portion of the lead wire composed of twisted wires is pressed and deformed in a flattened shape which is shortened with respect to the axial direction of the motor, the outer configuration with respect to the axial direction of the motor is shortened and downsized.

Furthermore, according to the present invention, since the leading-out portion of the lead wire is pressed and deformed in a flattened shape by resistance welding or by ultrasonic welding along with brazing material, and the leading-out portion of the lead wire is drawn into the machine while placing the area-reduced side in the axial direction of the motor and is connected to the inner conductor by resistance welding, it is not necessary to add brazing material in the welding-connection thereof to the inner conductor body thereby promoting the productivity. Furthermore, the device is excellent in the water proof performance.

Example 4

Figure 6A:
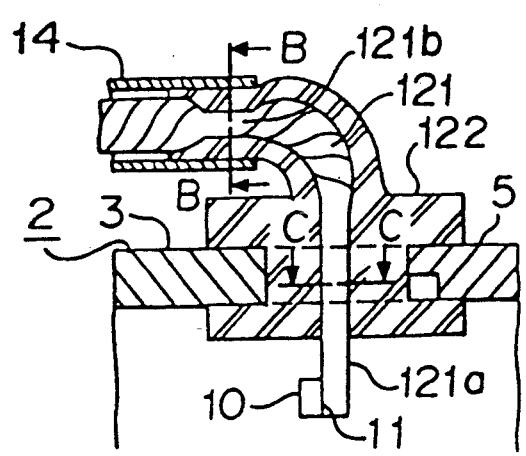
FIG. 6A is a sectional diagram of a third embodiment of a leading-out device for a lead wire of a starter motor according to the present invention, FIG. 6B, a sectional diagram taken along a line B—B of FIG. 6A, and FIG. C, a sectional diagram taken along a line C—C of FIG. 6A.
Figure 6B:
Figure 6C:

FIG. 6A is a sectional diagram of a fourth embodiment of a leading-out device for a lead wire of a DC motor according to the present invention. A leading-out portion 121a of a lead wire 121 composed of twisted wires at an end side thereof is pressed and deformed so that the section is flattened into a rectangular shape or the like by resistance welding or by ultrasonic welding, along with a brazing material. A portion of the lead wire 121 above the leading-out portion 121a is bent in an arcuate form. A constricted portion 121b is formed at an upper portion of the bent portion by pressing and reducing the bent portion in a rectangular section or the like by resistance welding or by ultrasonic welding with or without a brazing material. Examples of sections of the leading-out portion 121a and the constricted portion 121b are shown in FIGS. 6B and 6C. Accordingly, even when the lead wire 121 is composed of twisted wires, by forming the constricted portion 121b, the bending by an angle of 90° or the like can firmly be maintained.

An end side of the deformed lead wire 121 is inserted into a mold of forming a grommet (not shown), positioning the lead wire 121 in the mold employing the leading-out portion 121a and the constricted portion 121b, and a gummy material is charged in the mold thereby forming a grommet 122 by the integral forming. A synthetic gum, a synthetic resin series gum or the like is employed for the grommet 122. If the grommet requires thermal resistance, a corresponding material is employed.

Example 5

Figure 7A:
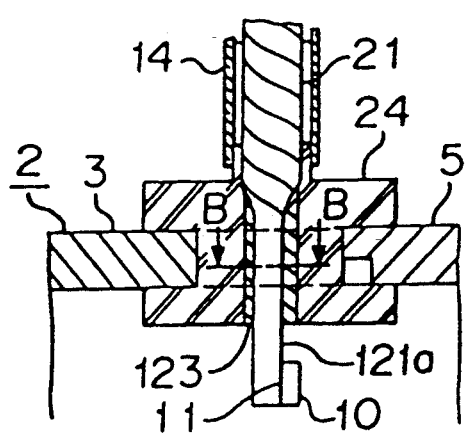
FIG. 7A is a sectional diagram of a fourth embodiment of a leading-out device for a lead wire according to the present invention and FIG. 7B, a sectional diagram taken along a line B—B.
Figure 7B:
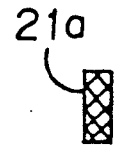

FIG. 7A is a sectional diagram showing a fifth embodiment of a leading-out device for a lead wire according to the present invention. A coating layer 123 is integrally formed o the outer periphery of the leading-out portion 121a at an end of the lead wire 21 wherein the section thereof is reduced and formed into a rectangular shape, by a mold (not shown) employing a heat-resistant gum such as polybutylene terephthalate (PBT). The grommet 24 is integrally formed with the end of the coated lead wire 21 by a mold (not shown) employing a synthetic gum, a synthetic resin series gum, a thermoplastic elastomer or the like. In this way, thermal resistance is promoted. The device can meet the required function by employing a gummy material corresponding to the requirement for the coating layer 123 and by laminating at least two kinds of forming materials for the coating layer 123 and the grommet 24.

As stated above, according to the present invention, the leading-out portion at one end side of the lead wire is deformed in a rectangular form flattened with respect to the axial direction of the motor and the grommet is integrally formed with the one end side of the lead wire. Therefore, the integration operational performance is promoted, the waterproof can firmly be maintained and the protruding length of the leading-out portion from the grommet can be determined in a predetermined length. Moreover, in case of bending a portion of the lead wire above the leading-out portions, by providing the constricted portion at the other end of the bent portion which is reduced and deformed in a rectangular shape, the bent state of the lead wire is maintained and the integral forming of the grommet at the one side can easily be performed. Furthermore, the required performance can be promoted by forming the grommet by laminating at least two kinds of gummy materials at the leading-out portion of the lead wire.

We claim:

1. A lead-out arrangement for passing an electrical conductor of a DC starter motor of an internal combustion engine through a generally cylindrical housing thereof, comprising:
   a) a resilient grommet disposed in an aperture in a side of the housing,
   b) an electrical conductor composed of a plurality of twisted wires, said wires being metallurgically bonded together to form a solid, unitary lead at an end portion of the conductor extending through the grommet and into an interior of the housing, perpendicular thereto,
   c) said end portion defining, in cross-section, a generally flattened shape having a larger, width dimension oriented perpendicular to an axis of the housing and a smaller, thickness dimension oriented parallel to the housing axis,
   d) an inner conductor of the motor disposed within the housing at a terminus of the end portion, and
   e) a weld establishing electrical connection between said inner conductor and said terminus.

2. An arrangement according to claim 1, wherein said flatted shape is one of semi-circular and rectangular.

3. An arrangement according to claim 1 or 2, wherein the wires are metallurgically bonded by welding.

4. An arrangement according to claim 3, wherein said twisted wires are welded together by one of resistance welding and ultrasonic welding, and include a brazing material for implementing the weld of sub-paragraph e).

5. An arrangement according to claim 1 or 2, wherein the grommet is integrally formed with the end portion.

6. An arrangement according to claim 5, wherein the grommet is integrally formed with the end portion through a coating layer which is coated on the end portion with a material other than a mold resin.

7. An arrangement according to claim 5, wherein an unwelded portion of the electrical conductor exterior of the housing is bent in an arcuate shape at a right angle to lie parallel to the housing, and the grommet is molded about the welded end portion and the unwelded, bent portion.

8. An arrangement according to claim 7, wherein the twisted wires in a portion of the electrical conductor exiting the arcuate bend are welded together and flattened.

9. An arrangement according to claim 5, wherein said twisted wires are welded together by one of resistance welding and ultrasonic welding, and include a brazing material for implementing the weld of sub-paragraph e).

10. A method of leading a twisted wires electrical conductor through an aperture in a side of a generally cylindrical housing of a DC starter motor, comprising the steps of:
   a) disposing a resilient grommet in the aperture,
   b) metallurgically bonding the twisted wires together to form a solid, unitary lead at an end portion of the conductor such that said end portion defines, in cross-section, a generally flattened shape,
   c) inserting the end portion through the grommet and into an interior of the housing such that a larger, width dimension of the flattened shape is oriented perpendicular to an axis of the housing and a smaller, thickness dimension is oriented parallel to the housing axis, and
   d) welding a terminus of the end portion to an inner conductor of the motor disposed within the housing.

11. A method according to claim 10, wherein said flattened shape is one of semi-circular and rectangular.

12. A method according to claim 10 or 11, wherein said twisted wires are welded together by one of resistance welding and ultrasonic welding, and include a brazing material for implementing the welding step of sub-paragraph d).

13. A method of leading a twisted wires electrical conductor through an aperture in a side of a generally cylindrical housing of a DC motor, comprising the steps of:
   a) metallurgically bonding an end of the twisted wires electrical conductor to form a solid, unitary lead at an end portion of the conductor having a generally flattened shape,
   b) protruding the end portion by a predetermined dimension and integrally molding a resin with the end portion to form a grommet,
   c) installing the grommet and integral end portion in the aperture of the motor housing from the outside of the motor such that a larger, width dimension of the flattened shape is oriented perpendicular to an axis of the housing and a smaller, thickness dimension is oriented parallel to the housing axis, and
   d) metallurgically bonding a terminal of the motor to the protruded end portion.

14. A method according to claim 13, wherein the flattened shape is one of semi-circular and rectangular.

15. A method according to claim 13, wherein the metallurgical bonding of sub-paragraphs a) and d) comprises welding.

16. A method according to claim 15, wherein the welding in sub-paragraph d) comprises one of resistance welding and ultrasonic welding along with a brazing material.

17. A method according to claim 13 or 14, wherein forming the end portion is implemented by:
   providing a constricted portion in a mid-region of the electrical conductor composed of twisted wires, wherein a section thereof is constricted and metallurgically bonded;
   metallurgically bonding a remaining end of the lead wire of a predetermined length beyond the constricted portion to form the flattened shape; and
   bending a twisted wire portion intermediate the mid-region and remaining end in an arcuate shape.

18. A method according to claim 13 or 14, wherein the step of forming the grommet in sub-paragraph b) comprises the steps of:
   forming a coating layer on the end portion by coating the end portion with a material other than a molding resin, and
   integrally molding the resin on the coating layer.

19. A method according to claim 16, wherein the flattened shape is one of semi-circular and rectangular.

* * * * *